US005792370A

United States Patent [19]
Whipple

[11] Patent Number: 5,792,370
[45] Date of Patent: Aug. 11, 1998

[54] CHEMICAL METHOD FOR DESTRUCTION OF PATHOGENIC ORGANISMS IN WATER

[75] Inventor: Earle R. Whipple, 9 Reed St., Lexington, Mass. 02173

[73] Assignees: Earle R. Whipple, Lexington, Mass.; Carmen Alonso de Whipple, Barcelona, Spain

[21] Appl. No.: 979,332

[22] Filed: Nov. 24, 1996

Related U.S. Application Data

[60] Provisional application No. 60/031,630, Nov. 25, 1996.
[51] Int. Cl.⁶ .................................. C02F 1/50; C02F 1/72
[52] U.S. Cl. ........................ 210/749; 210/759; 210/764
[58] Field of Search ............................ 210/749, 759, 210/764

[56] References Cited

U.S. PATENT DOCUMENTS

| 4,265,847 | 5/1981 | Hunt et al. | 264/122 |
| 4,469,614 | 9/1984 | Martin | 514/705 |
| 4,536,389 | 8/1985 | White et al. | 424/44 |
| 5,008,106 | 4/1991 | Merianos et al. | 424/78.06 |
| 5,741,520 | 4/1998 | DeSenna | 424/466 |

Primary Examiner—Neil McCarthy
Attorney, Agent, or Firm—Mark P. White

[57] ABSTRACT

A Method for destruction of pathogenic organisms in water is described. When used in conjunction with a rough filtration prior to chemical treatment, the method purifies drinking water for consumption by humans. The method is based on the well-known ability of alkaline solutions to kill micro-organisms. The method uses dry pellets of either sodium hydroxide (NaOH) or potassium hydroxide (KOH). These are added to the water in proper proportion. The resulting alkaline solution is allowed to stand for a short period of time, typically one hour or more. And then the resulting solution is neutralized by the addition of an edible acid, such as citric or tartaric acid. The resulting water has a more or less neutral pH, and does not have an unpleasant taste.

6 Claims, 2 Drawing Sheets

CHEMICAL METHOD FOR DESTRUCTION OF PATHOGENIC ORGANISMS IN WATER

PROSECUTION HISTORY

This application is a continuation of Provisional application Ser. No. 60/031,630 filed on Nov. 25, 1996.

BACKGROUND OF THE INVENTION

1. Field of the Invention

The present invention relates to a method for purifying water for human consumption, and more specifically to such a method which purifies the water by means of destroying pathogenic organisms therein.

2. Description Relative to the Prior Art

Purifying water for human consumption is a problem which has been with us since the beginning of time. Purification involves removal of many different types of contaminants, including particles, chemicals, etc. One of the most difficult and serious problems in this regard is to kill biological contaminants such as algae, bacteria, etc.

Chlorination has had a long history as a preferred method of removing these biological contaminants from drinking water. Chlorine is used together with polymeric compounds which coagulate the contaminants into large particles. The particles so created are then easily filtered out of the system.

Chlorine has fallen into disfavor, however, because of environmental considerations. As a result, new methods are required to remove these biological components from drinking water which do not leave toxic components like chlorine in the water, or provide disposal problems.

The new method, disclosed herein, is appropriate for use in purifying relatively small amounts of water. The method possesses a number of advantages over previous methods of water purification. It is particularly suitable for portable purification as required by campers, hikers, and the like. It does not address the problem of chemical or particulate contamination, but it does remove most biological contaminants without the use or production of any environmentally harmful substances. It is cheap and easy to employ.

This method has a number of advantages of the prior art for portable applications. First of all, only solids are required, and no liquids need be carried by the user. No reducing agents are involved, which are often hard to store. No bad taste is produced in the purified water, unlike chlorination, for example. No overdosing is likely, in contrast to iodine as a disinfectant. Preparation is extremely easy, and the amount of water purified can vary widely without changing the relative amounts of chemicals used. The compounds used are non-poisonous; stomach acids will neutralize the dilute alkali if swallowed, although a bad taste may be noted. The resulting product has a better electrolyte balance than pure water, due to the fact that a slight amount of sodium will remain in the water.

SUMMARY OF THE INVENTION

A general object of the present invention is to purify small amounts of water for human consumption by removing biological contaminants.

A further general object of the present invention is to effect said purification without creating environmentally harmful substances.

A further object of the present invention is to provide a method which is suitable for portable purification, and which may be easily and unobtrusively carried by a single person such as tourists, boaters, and during hiking, camping, etc.

According to one aspect of the invention, the water is first filtered to remove large particles. Next, between 300 and 500 mg of an alkali is added to the water. Then the solution is allowed to stand for one hour or more. And finally, a slight excess of an edible organic acid is added to neutralize the solution.

According to another aspect of the invention, the alkali is one of the group: which includes NaOH, KOH, $Na_2CO_3$, $K_2CO_3$, $Na_3PO_4$ and $K_3PO_4$.

According to another aspect of the invention, the edible organic acid is either citric or tartaric acid.

According to a final aspect of the invention, between 100 and 150 mg per liter of sodium peroxide ($Na_2O_2$) is added to the water directly after the alkali is added.

DETAILED DESCRIPTION OF THE PREFERRED EMBODIMENTS

Figure 1:
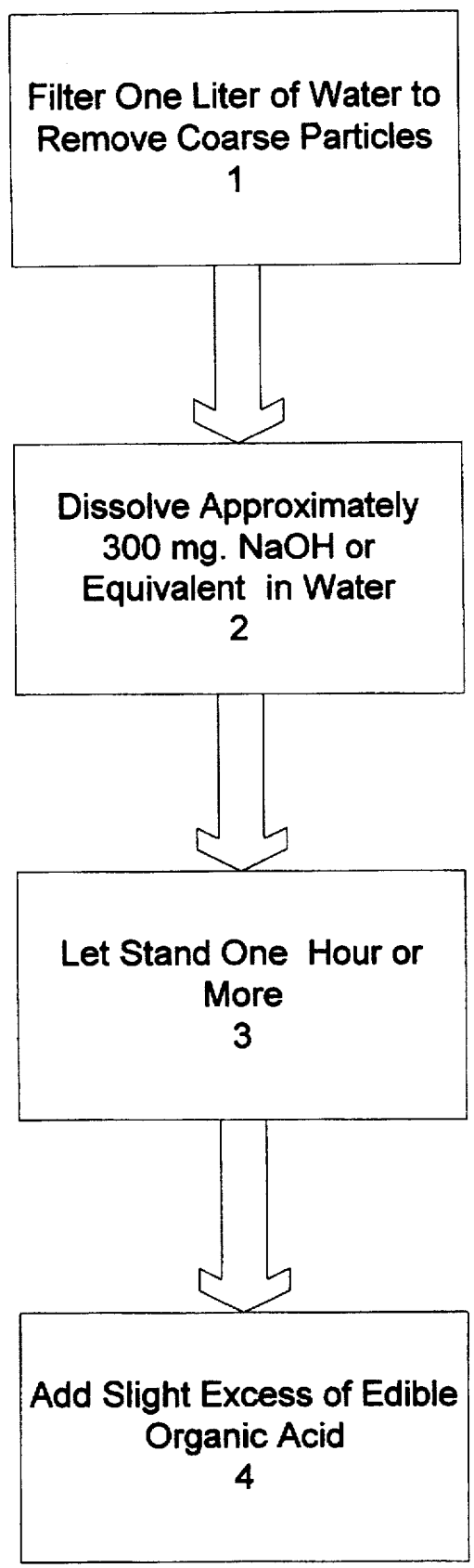
FIG. 1 depicts a flow chart of the steps used in the purification process in the first preferred embodiment.

This method relies on the destructive power of hydroxyl ion (high pH value) to destroy bacteria, viruses, spores and parasites in potential drinking water. Steps in the procedure are shown in FIG. 1 and the steps in said figure correspond to the steps described below.

1. Filter one liter of water through coarse filter paper. This step does not remove the organisms, but rids the water of sand, mud, leaf particles, particles of fecal matter, etc., which may consume hydroxyl ion.
2. Dissolve a small amount of NaOH (300–500) mg per liter, or between 420 and 700 mg per liter of KOH, or equivalent molar values (0.0075 to 0.0125 moles) of $Na_2CO_3$, $K_2CO_3$, $Na_3PO_4$ or $K_3PO_4$) in the water.
3. Let the solution stand for one hour or more. This step destroys the living organisms. The carbonates and phosphates furnish hydroxyl ion by hydrolysis.
4. Add a slight excess of an edible organic acid (citric acid or tartaric acid) to neutralize the hydroxyl ion. A very dilute solution of sodium (or potassium) citrate (or tartrate) and citric (or tartaric) acid results.

The result is a potable water containing healthful amounts of the organic acid salt and the organic acid. The low sodium (or potassium) content will usually be more beneficial than pure water. The method needs little time to produce large amounts.

The hydroxyl ion is a non-specific poison to very small organisms because it attacks the proteins and fats which compose life itself by hydrolyzing them. It has an advantage over specific poisons because of this.

One specific poison that has been used to kill organisms in water is iodine compounds. Depending on a person's sensitivity, iodine compounds can cause tension and nervousness by oversupplying iodine to the body, which is used to very low levels of iodine to function correctly. Iodine compounds further yield an unpleasant taste which is complained of by many users. In the present method, the poison used to kill the organisms (hydroxyl ion) is neutralized by the organic acid, and converted to water.

Filters have been developed to remove very small organisms in water. These filters have a large disadvantage because they have very small pores which quickly clog and require long times to produce a useful amount of drinking water. The filtration (using a coarse filter) of Step 1 goes very quickly.

Figure 2:
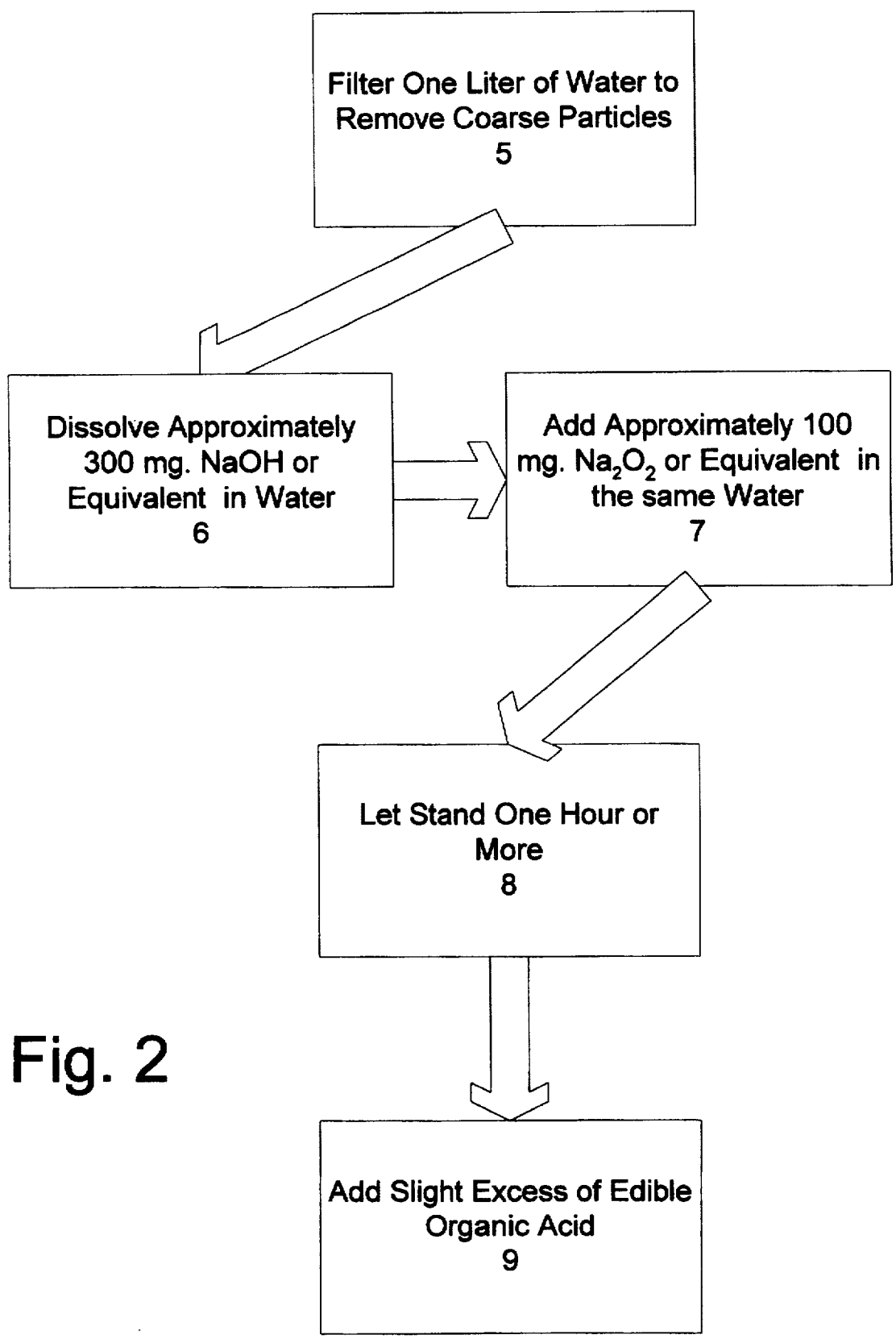
FIG. 2 depicts a flow chart of the steps used in the purification process in the second preferred embodiment.

A second embodiment utilizes the following steps, which are shown in FIG. 2 and the steps in said figure correspond to the steps described below.

5. Filter one liter of water through coarse filter paper. As before, this step does not remove the organisms, but rather removes gross particles from the water.
6. Dissolve a small amount of NaOH (300–500) mg per liter, or between 420 and 700 mg per liter of KOH, or equivalent molar values (0.0075 to 0.0125 moles) of $Na_2CO_3$, $K_2CO_3$, $Na_3PO_4$ or $K_3PO_4$) in the water
7. Add a slight amount of sodium peroxide ($Na_2O_2$), in the amount of 100–150 mg. Per liter of solution. This facilitates effective elimination of spores. Sodium peroxide is an oxidant which will help kill organisms in the alkaline solution. After the acid is added it produces hydrogen peroxide ($H_2O_2$), which decomposes slowly to water and oxygen. This very dilute peroxide is harmless.
8. Let the solution stand for one hour or more.
9. Add a slight excess of an edible organic acid (citric acid or tartaric acid) to neutralize the hydroxyl ion. A very dilute solution of sodium (or potassium) citrate (or tartrate) and citric (or tartaric) acid results.

I have made a trial of taste in the procedure to destroy pathogenic organisms in water. The materials used were NaOH and KOH pellets, and citric acid and tartaric acid (natural isomer), all of National Formulary (USP) grade. The equivalent weights for neutralization of strong alkali are almost identical for the two acids. Estimating by eye, I dissolved, in separate trials, roughly 300 mg of the hydroxides in a liter of water (KOH dissolves much faster). These solutions (ideally 0.0075 Molar in OH for NaOH) had a faint, flat taste, neither pleasant nor unpleasant. They did not irritate the mouth. I could not distinguish between Na and K.

Using a kitchen ½ teaspoon measuring spoon (and estimated fractions thereof I added, in different trials, about ⅔ teaspoon of citric or tartaric acid. Both solutions had a taste of acid, but the tartaric acid had definitely a stronger taste, after neutralizing the alkali. (Both acids of the grade used are about equally expensive; KOH is slightly more expensive than NaOH, but also has advantages as a diet supplement.)

I added about ⅔ teaspoon of tartaric acid to the hydroxide solution, which yielded a definite flavor. Adding another ⅓ teaspoon of tartaric acid yielded an unpleasant strong flavor.

When the amount of citric acid was reduced to an estimated ⅓ teaspoon, there was much less flavor. The flavor, therefore, appears to depend strongly on the excess-of acid added over the alkali, which is good for economy of use. The last trial mentioned gave a negligible flavor (for most people probably); it would not be nearly as acid. It appears that more alkali can be used, if the necessary amount of acid is not overshot, and not produce too much taste. When the acid used is citric acid, the taste of the resulting solution is more apparent, but is rather pleasant.

While the invention has been described with reference to specific embodiments, it will be apparent that improvements and modifications may be made within the purview of the invention without departing from the scope of the invention defined in the appended claims.

What is claimed as being new and desired to be protected by Letters Patent of the United States is as follows:

1. A method for the destruction of pathogenic organisms in water, consisting essentially of the steps of:

filtering the water to remove particles;

adding between 0.0075 and 0.0125 moles per liter of an alkali to the water, said alkali forming a solution with said water containing hydroxyl ions;

letting the solution stand for one hour or more whereby pathogenic organisms in said water are destroyed by said hydroxyl ions, and adding to said solution an amount of an edible organic acid in excess of that required to neutralize the solution.

2. The method of claim 1, wherein the alkali is selected from the group consisting of NaOH, KOH, $Na_2CO_3$, $K_2CO_3$, $Na_3PO_4$ and $K_3PO_4$.

3. The method of claim 2, wherein the edible organic acid is either citric or tartaric acid.

4. A method for the destruction of pathogenic organisms in water, consisting essentially of the steps of:

filtering the water to remove particles;

adding between 0.0075 and 0.0125 moles per liter of an alkali to the water, said alkali forming a solution with said water containing hydroxyl ions;

adding between 100 and 150 mg per liter of $Na_2O_2$ to the water;

letting the solution stand for one hour or more, whereby pathogenic organisms in said water are destroyed by said hydroxyl ions and said $Na_2O_2$, and adding to said solution an amount of an edible organic acid in excess of that required to neutralize the solution.

5. The method of claim 4, wherein the alkali is selected from the group consisting of: NaOH, KOH, $Na_2CO_3$, $K_2CO_3$, $Na_3PO_4$ and $K_3PO_4$.

6. The method of claim 5, wherein the edible organic acid is either citric or tartaric acid.

* * * * *